United States Patent [19]
Bhatia

[11] 3,730,035
[45] May 1, 1973

[54] CUTTING TUBULAR PLASTIC EXTRUSION

[75] Inventor: Mahesh Bhatia, Woodside, N.Y.

[73] Assignee: Anchor Plastics Company, Inc., Long Island City, N.Y.

[22] Filed: Oct. 12, 1971

[21] Appl. No.: 188,360

[52] U.S. Cl. ................83/54, 83/169, 83/701
[51] Int. Cl. ...............................B26d 3/16
[58] Field of Search.....................83/54, 22, 14, 13, 83/169, 701

[56] References Cited

UNITED STATES PATENTS

| | | | |
|---|---|---|---|
| 1,997,843 | 4/1935 | Warrell | 83/22 X |
| 2,802,530 | 8/1957 | Kaufman | 83/22 X |
| 3,567,088 | 3/1971 | Andersen | 83/169 X |

*Primary Examiner*—James M. Meister
*Attorney*—Greene & Durr

[57] ABSTRACT

The disclosure relates to a process and apparatus for cutting extruded plastic tubes while avoiding excessive distortion of the tubes wherein a fluid pressure differential is created between the inside and outside of the tube on both sides of the cutting knife so as to keep the tube from collapsing under the pressure of the knife.

4 Claims, 2 Drawing Figures

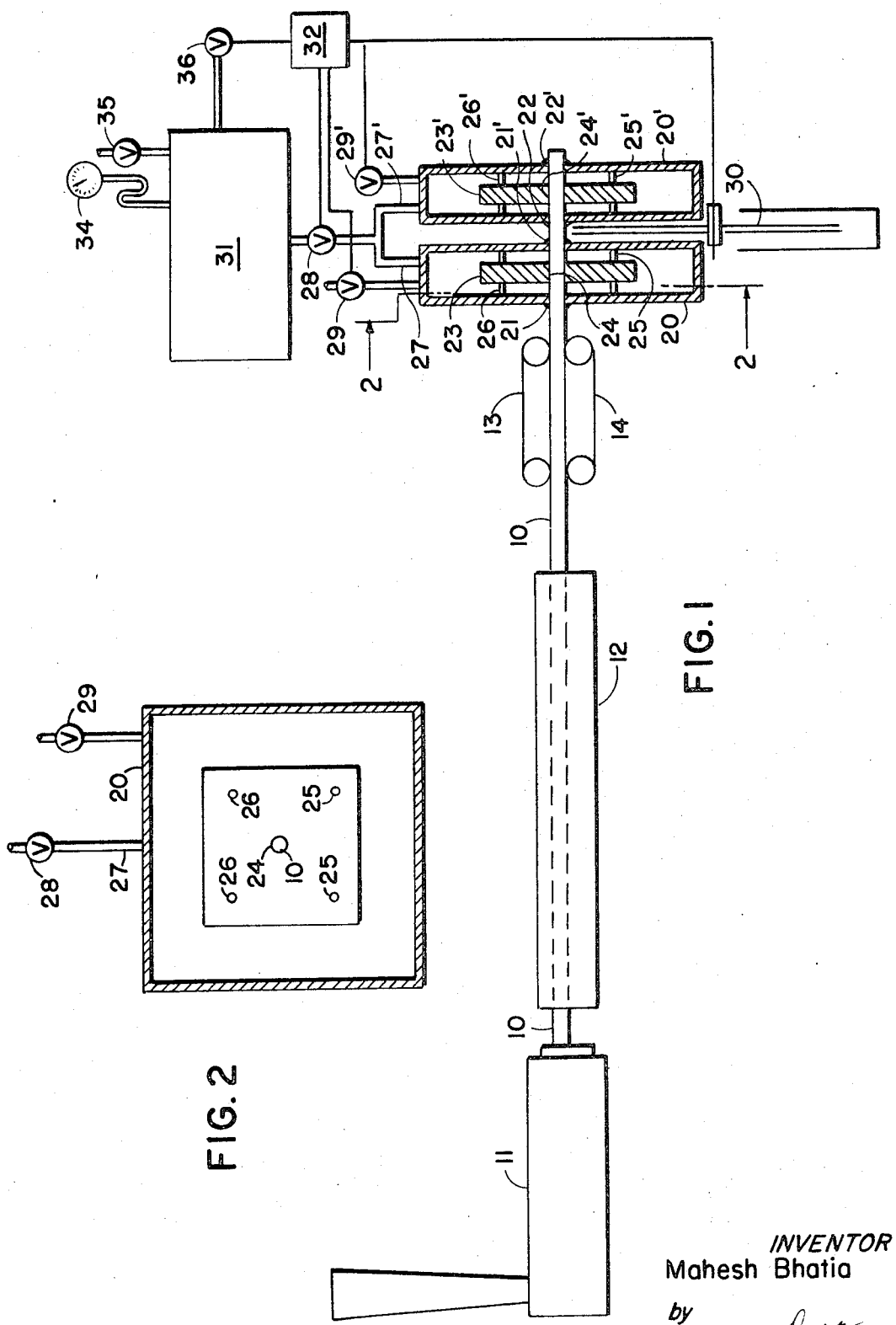

CUTTING TUBULAR PLASTIC EXTRUSION

This invention relates to the process and apparatus for cutting tubular plastic extrusion products of the type which collapse under pressure or impact from a knife or saw.

With tubular plastic extrusions, especially thin-walled tubular plastics, the tube collapses under the pressure of the cutting tool and may be more or less permanently deformed by the pressure of the cutting tool.

Among the objects of the invention is to provide a process and apparatus for preventing the collpasing of tubular plastic extrusion products when cut by an impact tool.

The objects of the invention are attained by providing a pressure differential between the interior and the exterior of the tube, so as to hold the tube against collapsing. Thus, the tube is passed through two substantially air-tight chambers, one on each side of the cutting tool. As the cutting tool is moved to cut the tube, vacuum is applied to the chambers to hold the tube in expanded condition while the cutting tool is piercing the tube. Vacuum is applied to the entire surface or in the region which is deformed by impact. Upon release of the vacuum, the portion of the tube which has been cut off is pushed through the vacuum chamber by the continuous uncut tubular extrusion.

For a complete understanding of the invention, reference is made to the accompanying drawings illustrating a preferred embodiment, but it will be understood that the invention may be otherwise embodied within the scope of the broader claims in the drawings:

FIG. 1 is a side view, somewhat diagrammatic, of an apparatus made according to the invention.

FIG. 2 is a cross-sectional detail view taken on line 2—2 of FIG. 1.

The tubular product 10 is formed by extrusion device 11 in known manner and is passed directly through cooling device 12. Cooling device 12 is shown only diagrammatically and may include liquid or gaseous (air) cooling.

Tube 10 is positively forwarded by two or more take-off belts 13,14 into the chambers 20 and 20'. The chambers 20 and 20' are similarly constructed, each being provided with flexible elastomeric gaskets 21, 21', 22, 22', at the entrance and exits, respectively. In a central portion of the chamber, jigs 23, 23' containing an opening 24, 24', suitably supported by rods 25, 25', 26, 26' so that the opening 24 or 24' is aligned with the openings in gaskets 21, 22 and with the tube 10. Each chamber is provided with a tubular outlet 27, 27' connected through valve 28 to vacuum chamber 31. Each chamber is also provided with a vent and valve 29, 29' to release the vacuum. Vacuum chamber 31 acts as a vacuum reservoir to allow rapid vacuum cycles in chamber 20 and 20'.

A suitable electronic control device 32 is provided to operate valves 28, 29, 29', and the knife 30, so that the vacuum is momentarily applied as the knife is about to cut the tube and so that the vacuum is released as soon as the tube has been cut. Such electronic control circuits are well-known in the industry and are not described in detail here. The vacuum chamber 31 may also be provided with a guage 34, relief valve 35, and valve connection 36 connecting to a vacuum pump (not shown), which is also controlled by the electronic device 32.

In operation, the tube 10, after cooling, is propelled by conveyor 13, 14 into chambers 20, 20'. After a predetermined length of tube has passed through chamber 20', cutting device 30 (knife or saw) is rotated and immediately before it strikes the tube, vacuum is applied so that the tube does not collapse under the initial pressure of the cutting device. After the tube is cut, the vacuum is released so that the uncut portion of the tube coming from chamber 20 pushes the cut tube out of chamber 20'. As is known in the art, the length of tube allowed to pass through/chamber 20' before the next cycle of the cutting knife can be regulated solely by a timing means or by some triggering device applied to the free end of the tube passing out of chamber 20'.

We claim:

1. In a process for making relatively thin-walled plastic tubular bodies of predetermined length by extruding a continuous plastic tube and cutting the tube to the desired length, the improvement comprising applying a pressure differential to the tube at two closely spaced regions along the length thereof, to hold the tube against collapsing and cutting the tube while so held in the region between said two closely spaced regions.

2. The process as claimed in claim 1 wherein said pressure differential is applied by applying a vacuum to the outside surface of the tube.

3. An apparatus for making finite lengths of relatively thin-walled plastic tubular bodies from a continuously extruded tube comprising means for positively propelling the tube, a first and second substantially air-tight chambers, each having entrance and exit openings for the passage of said tubular bodies, means for simultaneously applying a vacuum to said chambers, means for releasing the vacuum from said chambers, and impact cutting means adapted to cut the tube extending between the chambers.

4. The process as claimed in claim 1 wherein said tube is cut by impact with a cutting tool, said pressure differential being applied to only those regions of the tube adjacent the portion which is deformed by the impact of the cutting tool.

* * * * *